(12) United States Patent
Dortch et al.

(10) Patent No.: US 8,773,503 B2
(45) Date of Patent: Jul. 8, 2014

(54) AUTOMATED PANORAMIC CAMERA AND SENSOR PLATFORM WITH COMPUTER AND OPTIONAL POWER SUPPLY

(71) Applicant: Thermal Imaging Radar, LLC, Lehi, UT (US)

(72) Inventors: Michael D. Dortch, Saratoga Springs, UT (US); Larry J. Price, South Jordan, UT (US)

(73) Assignee: Thermal Imaging Radar, LLC, Lehi, UT (US)

( * ) Notice: Subject to any disclaimer, the term of this patent is extended or adjusted under 35 U.S.C. 154(b) by 0 days.

(21) Appl. No.: 13/745,514

(22) Filed: Jan. 18, 2013

(65) Prior Publication Data

US 2013/0188010 A1    Jul. 25, 2013

Related U.S. Application Data

(60) Provisional application No. 61/632,218, filed on Jan. 20, 2012.

(51) Int. Cl.
*H04N 7/00* (2011.01)

(52) U.S. Cl.
USPC ............................................. 348/37

(58) Field of Classification Search
USPC ................. 348/3, 38, 37; 74/813 R
See application file for complete search history.

(56) References Cited

U.S. PATENT DOCUMENTS

| | | | |
|---|---|---|---|
| 3,648,384 A * | 3/1972 | Roberts | 434/315 |
| 3,769,501 A * | 10/1973 | McDonough | 431/359 |
| 4,263,513 A | 4/1981 | Palluet | |
| 4,602,857 A | 7/1986 | Woltz | |
| 4,922,275 A * | 5/1990 | Hughes | 396/427 |
| 4,982,218 A * | 1/1991 | Tsuboi et al. | 396/132 |
| 5,752,113 A | 5/1998 | Borden | |
| 5,790,183 A | 8/1998 | Kerbyson | |
| 6,738,073 B2 | 5/2004 | Park et al. | |
| 6,948,402 B1 * | 9/2005 | Amendolea | 74/820 |
| 6,991,384 B1 | 1/2006 | Davis | |
| 6,992,722 B2 | 1/2006 | Jung | |
| 7,324,135 B2 | 1/2008 | Ouchi et al. | |
| 7,381,952 B2 | 6/2008 | Teich et al. | |
| 7,423,272 B2 | 9/2008 | Hasegawa et al. | |
| 7,436,438 B2 | 10/2008 | Sim et al. | |
| 7,732,771 B2 | 6/2010 | Hasegawa et al. | |
| 7,991,575 B2 | 8/2011 | Vogel et al. | |
| 8,106,936 B2 | 1/2012 | Strzempko et al. | |
| 8,194,912 B2 | 6/2012 | Kitaura et al. | |

(Continued)

*Primary Examiner* — Mehrdad Dastouri
*Assistant Examiner* — Mohammed Rahaman
(74) *Attorney, Agent, or Firm* — Workman Nydegger

(57) ABSTRACT

An indexing mechanism may include a drive table, an indexing table, a control ring between the tables, and a cam follower. The cam includes lobes on an inner surface. A drive arm of the cam follower is coupled to the drive table and an end of an indexing arm of the cam follower rides over the lobes during use. A spring may be coupled between the drive table and the indexing table. As the drive table rotates continuously, the components serve to move the indexing table in a non-continuous movement, by which it stops for a period and then moves to the next stop, etc. A camera may take a still image at each stop position, and the images may be stitched together (e.g., through use of an onboard computer) to produce a panoramic image. A power supply may also be provided, so that the entire system may be self-contained.

20 Claims, 4 Drawing Sheets

(56) References Cited

U.S. PATENT DOCUMENTS

| | | |
|---|---|---|
| 8,285,512 B2 | 10/2012 | Vogel et al. |
| 8,355,042 B2 | 1/2013 | Lablans |
| 2001/0026684 A1 | 10/2001 | Sorek et al. |
| 2004/0183941 A1* | 9/2004 | McCutchen .................. 348/373 |
| 2008/0106593 A1 | 5/2008 | Arfvidsson |
| 2010/0097444 A1 | 4/2010 | Lablans |
| 2010/0142757 A1* | 6/2010 | Sandstrom et al. ........... 382/100 |
| 2011/0220797 A1 | 9/2011 | Hoelter |
| 2011/0316970 A1 | 12/2011 | Cheong |
| 2012/0127169 A1 | 5/2012 | Barcay et al. |
| 2012/0133639 A1 | 5/2012 | Kopf et al. |
| 2012/0299920 A1 | 11/2012 | Coombe et al. |
| 2012/0300019 A1 | 11/2012 | Yang et al. |
| 2012/0314066 A1 | 12/2012 | Lee et al. |
| 2012/0320148 A1* | 12/2012 | Unger ............................ 348/36 |
| 2013/0002807 A1 | 1/2013 | Vogel et al. |
| 2013/0030699 A1 | 1/2013 | Barnes et al. |
| 2013/0048855 A1 | 2/2013 | Abreo |
| 2013/0103303 A1 | 4/2013 | Lynch |

\* cited by examiner

Note: Drive Arm (6) and Drive Block (7), not shown for clarity.

AUTOMATED PANORAMIC CAMERA AND SENSOR PLATFORM WITH COMPUTER AND OPTIONAL POWER SUPPLY

CROSS REFERENCE TO RELATED APPLICATION

This application claims the benefit of U.S. Provisional Application No. 61/632,218, filed Jan. 20, 2012 entitled LOW POWER INDEXING MECHANISM, the disclosure of which is incorporated herein in its entirety.

BACKGROUND OF THE INVENTION

1. The Field of the Invention

The present invention is in the field of automated panoramic camera systems and platforms including indexing mechanisms.

2. The Relevant Technology

Panoramic images can be created by an array of wide angle cameras that together create a 360 degree field of view or by one camera with a fish eye lens or other panoramic mirror that allows for a continuous "minor ball" image that is later flattened out by computer. These images are limited in their ability to provide detail necessary to be useful for video surveillance because the sensors are stretched over wide field of views (sometimes a full 360 degrees).

The best panoramic images are typically created by moving a single or multiple cameras manually through a controlled series of stops and downloading these images to a computer where software can be used to stitch them together to create the full 360 degree field of view. This is a cumbersome and time consuming process that has limited use, especially in the video surveillance industry where real time video is critical.

A relatively new means of capturing thermal panoramic images is by continuously spinning a cryogenically cooled thermal sensor or other high speed camera at less than 60 RPM and capturing the images from the camera with a computer where they are stitched together and analyzed. These cryogenically cooled sensors have the ability to capture images in just a few nano seconds and do not need to stop to catch a still image if spinning at less than 60 RPM, which allows them to produce near real time video. However, these cooled sensors are power hungry and expensive, making them impractical in many applications. In addition, the high speed cameras have a very large lighting requirement making them of very limited use in other than full daylight conditions.

BRIEF SUMMARY

The automated panoramic camera and sensor platform of the present invention solves these problems by allowing a single, or multiple, cameras or sensors, including, less expensive, uncooled, thermal sensors, to be indexed through a series of stops which matches, or is less than, the field of view of the camera, and continuously downloads these images to an attached computer where they may be stitched together and analyzed for intruders or other motion in near real time. Because this device has the ability to completely stop for a short time to allow the capture of an image, a large variety of inexpensive still or video cameras are suitable for use in this device. A wide variety of cameras, sensors and/or lens combinations can also be accommodated because the "dwell time" and number of stops per revolution are easily adjustable, which parameters can both be varied to suit the camera or sensor by simply replacing a cam control ring. This allows the platform to be easily configured to accommodate the requirements of different cameras, sensors and lenses.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

LEGEND

1 Camera or Sensor
2 Indexing Table
3 Control Ring (Cam)
4 Drive Table
5 Indexing Arm
6 Drive Arm
7 Drive Block
8 Indexing Block
9 Outer Housing
10 Bearing Pins
11 Bearings
12 Slip Ring
13 Brushes or Contacts
14 Gearbox
15 Motor Housing
16 Motor
17 Base Plate
18 Camera or Sensor Cover
19 Rain Cap
20 Cover Adapter
21 Set Screw
22 Brush Block
23 Spring Holders
24 Spring
25 Optical or Magnetic Encoder
26 Encoder Ring
27 Automated Panoramic Camera and Sensor Platform
28 Computer
29 Power Supply

DETAILED DESCRIPTION OF THE PREFERRED EMBODIMENTS

Figure 4:
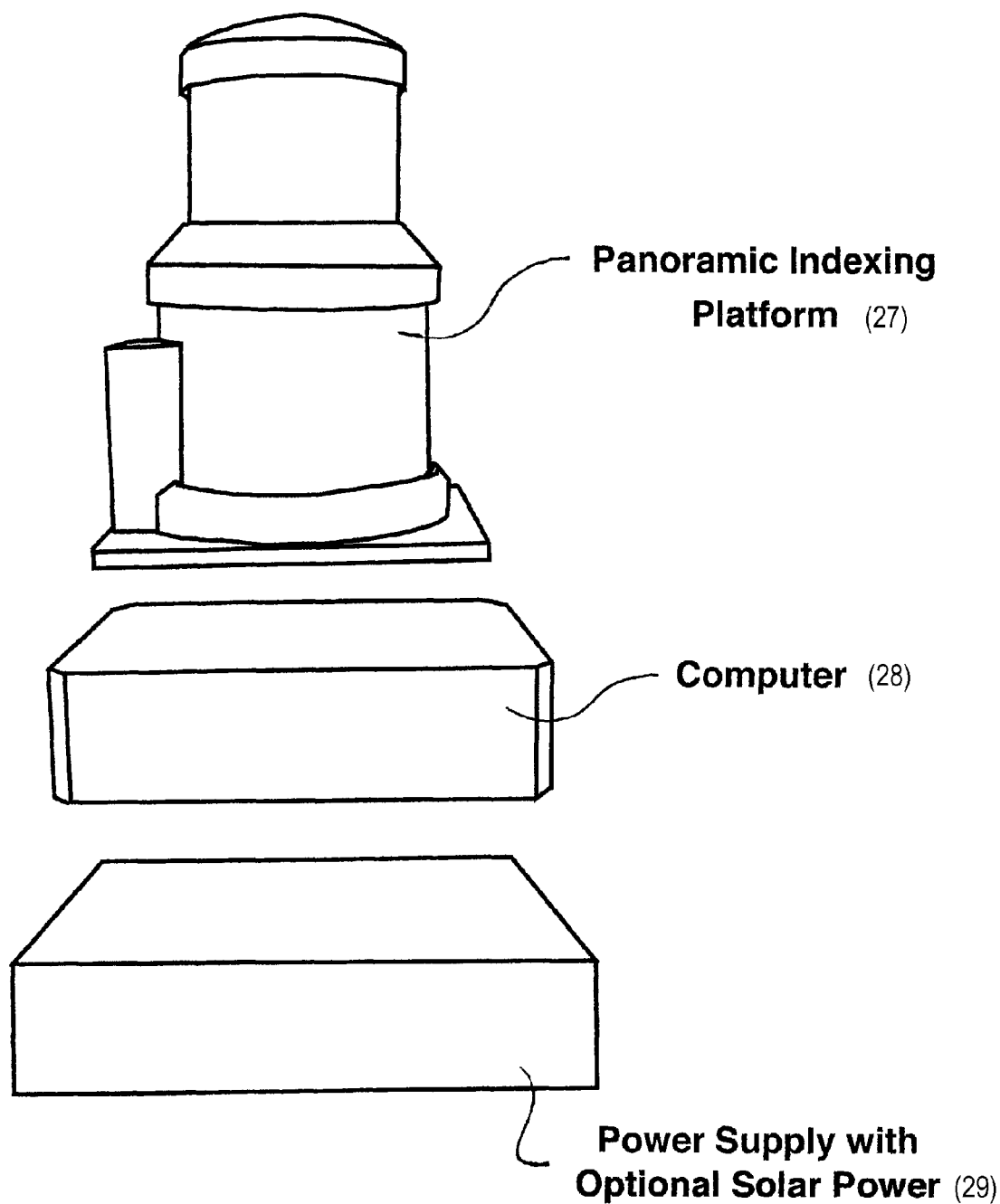
FIG. 4 is a schematic view of an exemplary automated panoramic camera and sensor platform, as well as a computer and power supply for a self-contained system.

In an exemplary embodiment, a small DC brushless motor (16) may be attached to the drive table (4) either directly by a gear box (14) or indirectly by a belt or other drive (not depicted). This drive table spins at a constant rate or may be adjustable e.g., via a motor control program located in the computer (28, FIG. 4). In an embodiment, speeds of 1 to 120 RPM are achievable depending on camera weight and lens configuration and can be set and maintained by the computer (28).

The drive table (4) is attached to an indexing mechanism; in this example, it is attached to the indexing table via a cam follower that includes two arms; (i) the drive arm (6), which may be attached to the drive table (4), by a drive block (7), on one end and (ii) the indexing arm (5) on the other. The indexing arm is attached to the indexing table by an indexing block (8). As shown, drive table (4) may be below indexing table (2). Both these arms may have small bearings attached to each end by the outer race of the bearing and may be connected to their respective blocks with bearing pins (10) that run through the blocks and through the bearing center hole. These pins attach the arms securely to the blocks while allowing the arms to swing freely.

Figure 1:
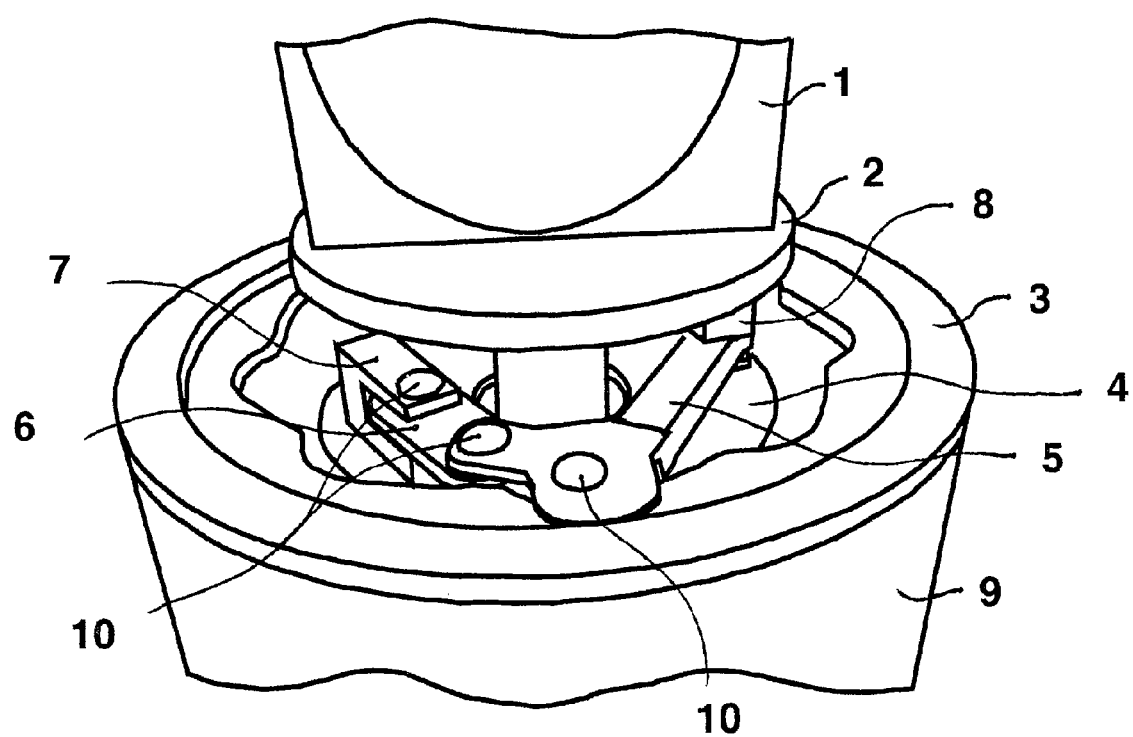
FIG. 1 is a perspective view of an exemplary indexing mechanism.
Figure 2:
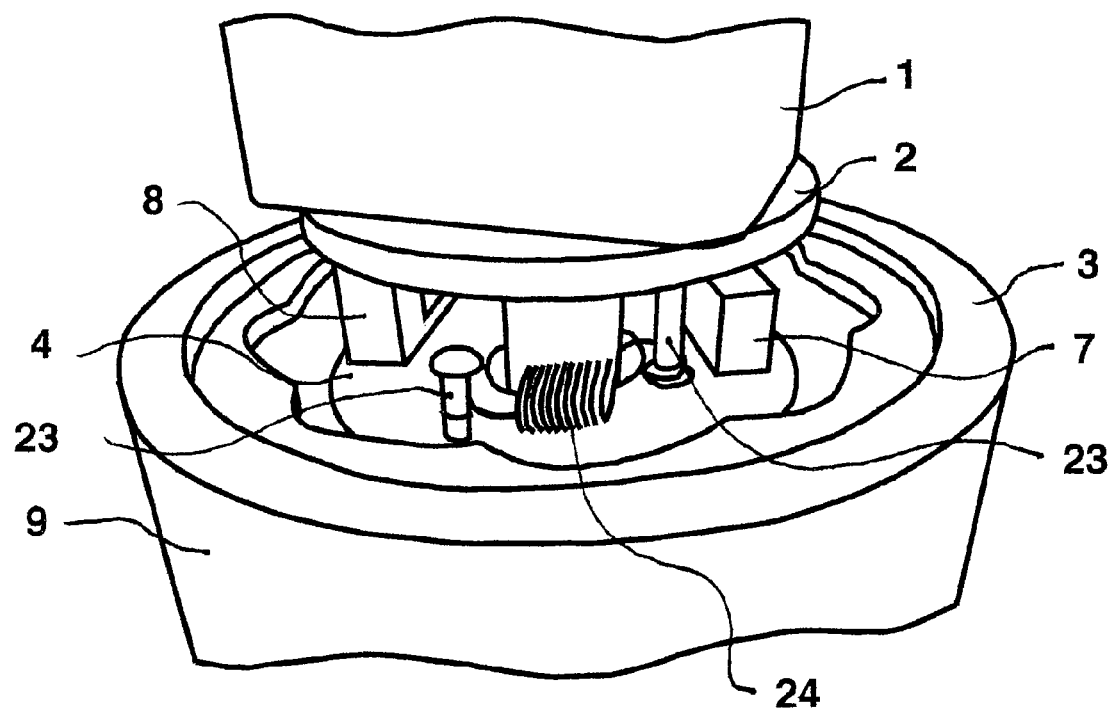
FIG. 2 is an opposite perspective view of the indexing mechanism of FIG. 1.
Figure 3:
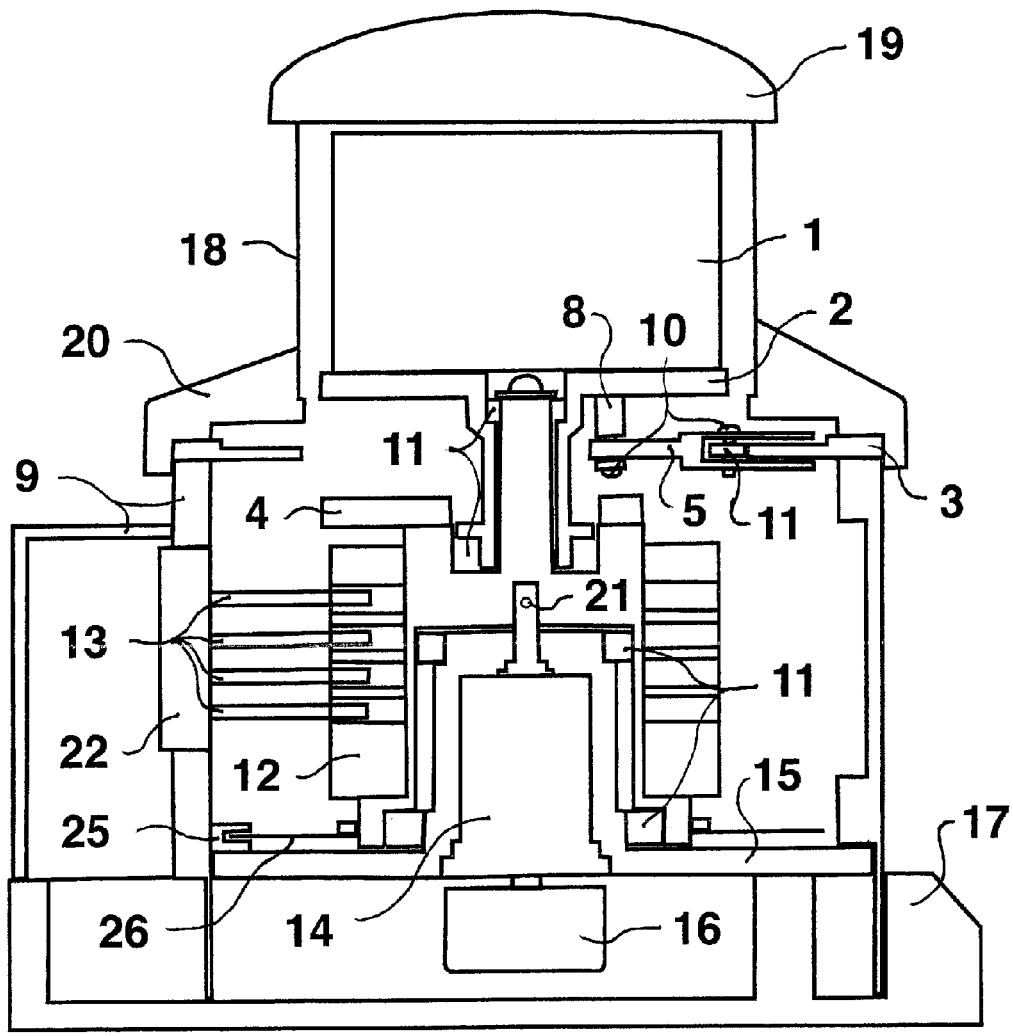
FIG. 3 is a cross-sectional view of an automated panoramic camera and sensor platform including the indexing mechanism of FIG. 1.

The drive arm (6) may be attached to the indexing arm (5) in the same way as the blocks (7,8) with the bearing pin (10) running through the indexing arm (5) and the center hole of the bearing in the drive arm (6), which also allows freedom of movement. The outside end of the indexing arm (5) may contain a small exposed bearing (11) (FIG. 3) attached with the same bearing pin (10), but the bearing may not be connected to another arm as the drive arm (6) but may be free to spin inside an elongate slot machined into the end of the index arm (5). This slot fits over the inside edge of the cam control ring (3) allowing the bearing to ride along the inside edge of the control ring (3). This control ring has a series of lobes cut into the inner surface thereof and serves as a cam which causes the indexing arm (5) to move in and out as its outer bearing (11) rides along these lobes in the control ring (3). The bearing on the index arm (5) may be kept in contact with the control ring (3) by a spring (24) or similar means. Spring 24 may be located on the opposite side of the drive and index arms (5,6) (FIG. 2) and may connect the lower drive table (4) with the upper indexing table (2) by two spring pins (23). For example, one spring pin (23) may be attached to lower drive table (4) while the other spring pin (23) may be attached to upper indexing table (2). The tension created between the drive table (4) and the indexing table (2) by the spring (24) creates an outward thrust on the indexing arm (5) and keeps it in constant contact with the control ring (3). The spring tension can be varied by replacement or adjustment to meet the needs of the camera, lens and speed requirements.

The constant spinning motion of the drive table (4) is transformed to an indexing motion (stop and start—non continuous motion) at the indexing table (2) by the in and out motion of the indexing arm (5) as it rides along the lobes of the control ring (3). The lobes are cut in such a way as to create a complete or substantially complete stopping of the indexing table (2) for a desired period of time (also determined by the slope of the lobes, which is called dwell. During the dwell period the spring (24) loads until the dwell period is over and then releases its stored energy back into the system helping the camera (1) mounted on indexing table (2) catch up to the speed of the drive table (4).

This also allows the system to recapture the energy stored in the spring (24) during the dwell period and use it at its time of highest need which is the acceleration of the camera or sensor from a stop (dwell period) to the speed necessary to catch back up with the drive table (4), thus allowing the system to operate at a very high level of efficiency.

With this particular indexing mechanism, the number of stops, dwell and rate of return can all be varied by simply replacing the control ring (3) with one that has been cut to the desired specifications. The dwell and rate of return can also be varied by altering the radius of attachment for the drive and index blocks (7,8) and the respective lengths of the drive and indexing arms (5,6). This allows the platform to be easily configured to match any camera, lens configuration and dwell requirements. For example, in an embodiment, control ring (3) may include from 3 to 30 lobes, from 4 to 20 lobes, or from 6 to 16 lobes. Physically larger diameter control rings may more easily accommodate more lobes (e.g., 20 or more lobes, 20-25 lobes, etc.). The lobes may be evenly distributed over the inner surface of cam control ring (3), so that the inner surface may be symmetrical. In another embodiment, the lobes may not be evenly distributed (e.g., a portion of the inner surface may be curved at a given constant radius where no lobes are present). Such a configuration may be desirable where a portion of a panorama may not need to be imaged (e.g., where the system is placed against a wall, only 180° or some other panorama may be required to be imaged. Various differently configured control rings may be provided, with different lobe configurations, as necessary. Depending on the particular application, one control ring may be removed, and another inserted in its place.

The lightweight nature of this particular indexing mechanism and the fact that energy otherwise wasted is stored in the spring and given back to the system when needed makes this unit extremely efficient. A 37 gram camera can be continuously indexed for less than five, or even one watt of power (e.g., about 0.5 watt). This makes this particular platform very desirable in battery or solar powered applications. Other, more conventional, indexing mechanisms can be used but may be typically larger, heavier and/or less efficient. Total power requirements for the entire system may be as low as about 5 watts, allowing the entire system to rely on solar power charging of a battery power supply for continuous operation.

Power is sent to and video and other digital information may be received from the camera or sensor (1) via a slip ring (12) which may contain 4-24 sections (e.g., 6-20, or 8-16 sections). Brushes or contacts (13) may ride along the slip ring (12) as it rotates and sends signals and power to and from the computer which attaches to the brushes (13) at the brush block (22). This can be used to transform a stationary connection from the computer and power supply, to a rotating connection which can be connected to the camera or sensor (1) at the top of the slip ring (12).

It is possible, and even desirable, to use video cameras or continuous sensors to capture the desired still shots used in creating the panoramic image. An encoder (25) may read an encoder ring (26) attached to the drive table (4) or the motor (16), which allows the computer to very accurately determine the position of the indexing table (2) relative to the control ring (3). This allows the computer to calculate when the camera or sensor will be still and consequently, which frame(s) should be captured for use in the creation of the panoramic image. The other frame(s), which may be blurred due to motion, can be discarded. This same encoder also allows the computer to send a sync signal to the video camera, still camera or sensor which will keep it in sync with the indexing platform so that frame capture can be started at just the right moment (e.g., where continuous capture is not employed). This allows for the highest possible speed of operation.

The camera or sensor cover (18) can be made of various materials that are transparent to the particular camera or sensor employed. Heating of the cover (18) may be necessary in cold environments to prevent icing or fogging (if required by the particular camera or sensor) and may be accomplished with the addition of a continuous heating element located at the bottom inside of the cover (18).

In an exemplary embodiment, the camera (1) and panoramic indexing platform (27) can be connected directly to the computer (28) which in turn can be directly connected to the power supply (29) allowing the entire unit to be completely self-contained. The power supply (29) may contain backup batteries of sufficient size to allow the complete unit to run continuously with only solar power input for charging. The computer (28) may contain a wireless card, cell card, satellite, or other wireless communication module or mechanism which allows it to send alerts, other alarms or to stream complete panoramic videos to an outside source for monitoring or management. It is also possible to have these communicate directly with satellites. In another embodiment, a hardwired connection may be provided.

Fire detection is an important use for the system when a thermal sensor is employed. In this example, the computer will have the ability to quickly scan the raw digital data looking only for temperature differentials of a preset amount which will rule out any natural occurring phenomenon and allow the unit to send a fire alert and video image of such to a predetermined monitoring station.

Thermal imaging cameras/sensors may be particularly preferred, as no shadows are present, there is no noticeable difference between night and day, etc.; thus, thermal imaging may be particularly preferred for surveillance.

In an embodiment, the indexing table (2) (and camera (1)) may remain stationary (i.e., the dwell time) for a period of about 30 to about 120 ms (e.g., about 60 ms) at each stop position corresponding to each lobe. Of course, other dwell times may similarly be provided for.

Although the indexing mechanism is described principally in the context of an automated panoramic camera and sensor platform, it will be understood that such indexing mechanisms may be employed in other environments where an indexed rotational movement (i.e., whereby the indexing table moves from one stop position to another, which a dwell period therebetween) is desired. Such other environments and uses include, but are not limited to manufacturing (where any general indexing is desired), sewing machines, looms, or other environments where such movement is desired. The indexing mechanism advantageously consumes very low power, which is advantageous in many applications. For example, when employed with a loom, one may interchange one cam control ring with another (differently configured) to alter the fabric pattern produced by the loom.

As used in this specification and the appended claims, the singular forms "a," "an" and "the" include plural referents unless the context clearly dictates otherwise.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An indexing mechanism comprising:
    a drive table;
    an indexing table;
    a cam control ring disposed between the drive table and the indexing table, the cam control ring including a plurality of lobes formed in an inner edge surface of the cam control ring, the inner edge surface of the cam control ring serving as a cam;
    a cam follower including an elongate drive arm and an elongate indexing arm, the elongate drive arm being coupled to the drive table and an end of the elongate indexing arm riding against the inner surface of the cam control ring, over the lobes, during use, so that the elongate indexing arm is caused to move in and out as it rides against the inner edge surface of the cam control ring, constant spinning of the drive table being transformed into an indexing motion of the indexing table by the in and out motion of the elongate indexing arm as it rides against the inner edge surface of the cam control ring; and
    a spring coupled between the drive table and the indexing table, the spring loading with tension created between the constantly spinning drive table and the indexing table when as the indexing table is stopped, the spring unloading and applying an accelerating thrust to the indexing table to move the indexing table once a dwell period corresponding to the inner edge surface of the cam control ring is over so as to aid in moving the indexing table to the next position.

2. An indexing mechanism as recited in claim 1, wherein the cam control ring includes from 6 to 16 lobes formed in an inner surface of the cam control ring.

3. An indexing mechanism as recited in claim 1, wherein the inner surface of the cam control ring is symmetrical.

4. An indexing mechanism as recited in claim 1, wherein the inner surface of the cam control ring is non-symmetrical.

5. An indexing mechanism as recited in claim 1, further comprising a motor and power supply for driving the drive table.

6. An indexing mechanism as recited in claim 5, wherein the motor requires no more than about 1 watt of continuous power to drive the indexing mechanism during use.

7. An automated panoramic camera and sensor platform comprising:
    an indexing mechanism comprising:
        a cam control ring disposed between the drive table and the indexing table, the cam control ring including a plurality of lobes formed in an inner edge surface of the cam control ring, the inner edge surface of the cam control ring serving as a cam;
        a cam follower including an elongate drive arm and an elongate indexing arm, the elongate drive arm being coupled to the drive table and an end of the elongate indexing arm riding against the inner surface of the cam control ring, over the lobes, during use, so that the elongate indexing arm is caused to move in and out as it rides against the inner edge surface of the cam control ring, constant spinning of the drive table being transformed into an indexing motion of the indexing table by the in and out motion of the elongate indexing arm as it rides against the inner edge surface of the cam control ring; and
        a spring coupled between the drive table and the indexing table, the spring loading with tension created between the constantly spinning drive table and the indexing table when as the indexing table is stopped, the spring unloading and applying an accelerating thrust to the indexing table to move the indexing table once a dwell period corresponding to the inner edge surface of the cam control ring is over so as to aid in moving the indexing table to the next position; and
    a camera mounted to the indexing table.

8. An automated panoramic camera and sensor platform as recited in claim 7, further comprising a computer configured to receive imaging data from the camera and configured to analyze panoramic image data from a plurality of still images from the camera.

9. An automated panoramic camera and sensor platform as recited in claim 8, further comprising satellite, cellular, or other wireless communication module for sending panoramic image data or other data from the automated panoramic camera and sensor platform to a monitoring location.

10. An automated panoramic camera and sensor platform as recited in claim 8, further comprising a hard wired connection for sending panoramic image data or other data from the automated panoramic camera and sensor platform to a monitoring location.

11. An automated panoramic camera and sensor platform as recited in claim 7, further comprising a power supply comprising a backup battery and a solar power generator for charging the battery.

12. An automated panoramic camera and sensor platform as recited in claim 7, wherein the camera is a thermal imaging camera.

13. A method of providing a panoramic image data from a single camera mounted to an indexing mechanism, the method comprising:
providing an automated panoramic camera and sensor platform comprising a camera mounted to an indexing table of an indexing mechanism and an indexing mechanism, the indexing mechanism comprising:
a cam control ring disposed between the drive table and the indexing table, the cam control ring including a plurality of lobes formed in an inner edge surface of the cam control ring, the inner edge surface of the cam control ring serving as a cam;
a cam follower including an elongate drive arm and an elongate indexing arm, the elongate drive arm being coupled to the drive table and an end of the elongate indexing arm riding against the inner surface of the cam control ring, over the lobes, during use, so that the elongate indexing arm is caused to move in and out as it rides against the inner edge surface of the cam control ring, constant spinning of the drive table being transformed into an indexing motion of the indexing table by the in and out motion of the elongate indexing arm as it rides against the inner edge surface of the cam control ring; and
a spring coupled between the drive table and the indexing table, the spring loading with tension created between the constantly spinning drive table and the indexing table when as the indexing table is stopped, the spring unloading and applying an accelerating thrust to the indexing table to move the indexing table once a dwell period corresponding to the inner edge surface of the cam control ring is over so as to aid in moving the indexing table to the next position; and
obtaining a plurality of still images from the camera at different lobe positions of the indexing mechanism.

14. A method as recited in claim 13, wherein the drive table rotates continuously during use and the indexing table moves intermittently so as to allow an unblurred still image to be taken when the indexing table is not moving.

15. A method as recited in claim 14, wherein the camera obtains still images when the indexing table is moving and when the indexing table is not moving, the method further comprising discarding images obtained when the indexing table is moving, the images obtained when the indexing table is not moving being retained for analysis.

16. A method as recited in claim 13, wherein the drive table rotates at a rate between about 1 RPM and about 120 RPM.

17. A method as recited in claim 13, wherein the drive table rotates at a rate of about 60 RPM.

18. A method as recited in claim 13, wherein the indexing mechanism continuously consumes no more than about 1 watt during use.

19. A method as recited in claim 13, wherein the indexing mechanism results in the indexing table remaining stationary for a period of about 30-120 ms at each stop position.

20. A method as recited in claim 13, wherein the indexing mechanism results in the indexing table remaining stationary for a period of about 60 ms at each stop position.

\* \* \* \* \*